United States Patent

[11] 3,592,411

[72] Inventor Philip H. Evans
Stourbridge, Worcester, England
[21] Appl. No. 844,539
[22] Filed July 24, 1969
[45] Patented July 13, 1971
[73] Assignee B S R Limited
Warley, Worcester, England
[32] Priority July 25, 1968
[33] Great Britain
[31] 35,519/68

[54] TAPE RECORDER
10 Claims, 2 Drawing Figs.

[52] U.S. Cl. 242/206, 274/11
[51] Int. Cl. B11b 15/32, G03b 1/04
[50] Field of Search 242/206—210, 54.1; 274/4, 11; 74/216.5, 226

[56] References Cited
UNITED STATES PATENTS

| | | | |
|---|---|---|---|
| 2,659,541 | 11/1953 | Camras | 242/54.1 |
| 2,978,198 | 4/1961 | Bierman | 242/207 |
| 3,072,352 | 1/1963 | Loewe | 242/202 |
| 3,085,758 | 4/1963 | Herrmann et al. | 242/207 X |
| 3,357,650 | 12/1967 | Sato | 242/201 |

*Primary Examiner*—Leonard D. Christian
*Attorney*—Kurt Kelman

ABSTRACT: A takeup drive for a takeup spool of a tape recorder comprising a pulley, an endless belt engaged with the pulley to drive the takeup spool from the pulley, a friction wheel, a slipping clutch to transmit drive from the friction wheel to the pulley, and means for driving the friction wheel from the capstan spindle. The means for driving the friction wheel from the capstan spindle can comprise a second friction wheel interposed between the first friction wheel and the capstan spindle, and can be mounted so as to be moved into engagement therewith as a result of movement of an arm which carries the pressure roller of the tape recorder.

PATENTED JUL 13 1971 3,592,411

INVENTOR
PHILIP H. EVANS
By [signature]
AGENT

TAPE RECORDER

BACKGROUND OF THE INVENTION

1. Field of the Invention

This invention relates to apparatus for recording and reproducing sound using magnetic tape, and is particularly concerned with the type of apparatus, commonly called a tape recorder, in which magnetic tape is drawn from a supply spool across an assembly of magnetic transducer heads, including an erase head, and recording and reproducing heads and is wound onto a takeup spool during normal recording and playback. In such apparatus, the transport of the tape during normal recording and playback is obtained by engagement of the tape between a driving spindle, driven from the electric motor of the apparatus, and generally called a "capstan spindle," and a pressure roller.

During normal recording and playback, the takeup spool has to be driven so that the tape is wound thereon, but as the linear speed of the tape is constant, the speed of rotation of the takeup spool has to vary as the tape coils up on the spool and the radius of the coil of the tape upon the spool progressively increases. Such apparatus is referred to hereinafter as "of the type specified."

2. Description of the Prior Art

In such apparatus, hitherto, variation in rotational speed of the takeup spool has been achieved by providing a slipping clutch on the spindle of the takeup spool and driving the one member of the slipping clutch at a constant speed in excess of the speed of rotation of the spool, the spool being braked relative to said one member by the constant speed at which the tape is fed to the takeup spool by the capstan spindle.

Hereinafter the expression "tape deck" is used to refer to the fixed base plate or like member of the tape recorder upon which the components are mounted and for clarity of description the apparatus is considered as operating with the tape deck in substantially horizontal plane, it will however be appreciated that the actual orientation of the tape deck during use may be different to the orientation described herein.

SUMMARY OF THE INVENTION

An object of the invention is to provide an improved form of takeup drive in apparatus of the type specified.

According to the invention we provide, in a tape recorder comprising, an assembly of magnetic transducer heads, a supply spool, a takeup spool, a takeup drive to drive the takeup spool, a capstan spindle and a pressure roller to urge a magnetic tape against the capstan spindle, whereby in use a tape is drawn from the supply spool, transported past the transducer head and taken up on the supply spool, the improvement wherein the takeup drive for the takeup spool comprises, a pulley, an endless belt engaged with the pulley to drive the takeup spool from the pulley, a friction wheel, a slipping clutch to transmit drive from the friction wheel to the pulley and means for driving the friction wheel from the capstan spindle.

BRIEF DESCRIPTION OF THE DRAWINGS

A tape recorder embodying the invention will now be described in more detail by way of example with reference to the accompanying drawings wherein.

DESCRIPTION OF PREFERRED EMBODIMENT

Figure 2:
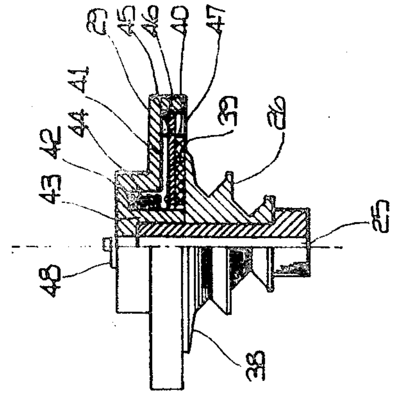

In this description, only those parts of the tape recorder which are necessary for understanding of the invention will be described, as the remainder of the construction may be of any generally known arrangement.

The tape recorder comprises a tape deck 10 having rotatably mounted thereon a supply spool 11 and a takeup spool 12.

The tape, not shown, is fed from a reel, not shown, provided on the supply spool 11, across an assembly of transducer heads 13 and between a rotatable capstan spindle 14 and a pressure roller 15 to a reel, not shown, provided on the takeup spool 12. Transport of the tape through the apparatus is achieved by frictional engagement of the tape with the capstan spindle 14 and the manner whereby this is achieved will be described hereinafter.

The capstan spindle 14 has a heavy wheel 16 connected thereto, generally known as the capstan, and the capstan spindle is rotated by means of an electric motor 17 provided below the deck plate. The electric motor 17 has a stepped driving spindle 18 and a rubber-edged disc 19 is interposed between an appropriate step on the spindle 18 and the periphery of the capstan 16. The axial position of the rubber disc is adjustable so that it may be engaged with any desired one of the steps on the spindle 18 to provide a desired speed of tape transport.

The tape is urged against the capstan spindle 14 by the pressure roller 15 which is carried, together with pressure pads 20 which urge the tape into contact with operative faces of the transducer heads 13 upon an arm 21 pivoted at one end 22 about a vertical axis 23 on the tape deck.

Figure 1:
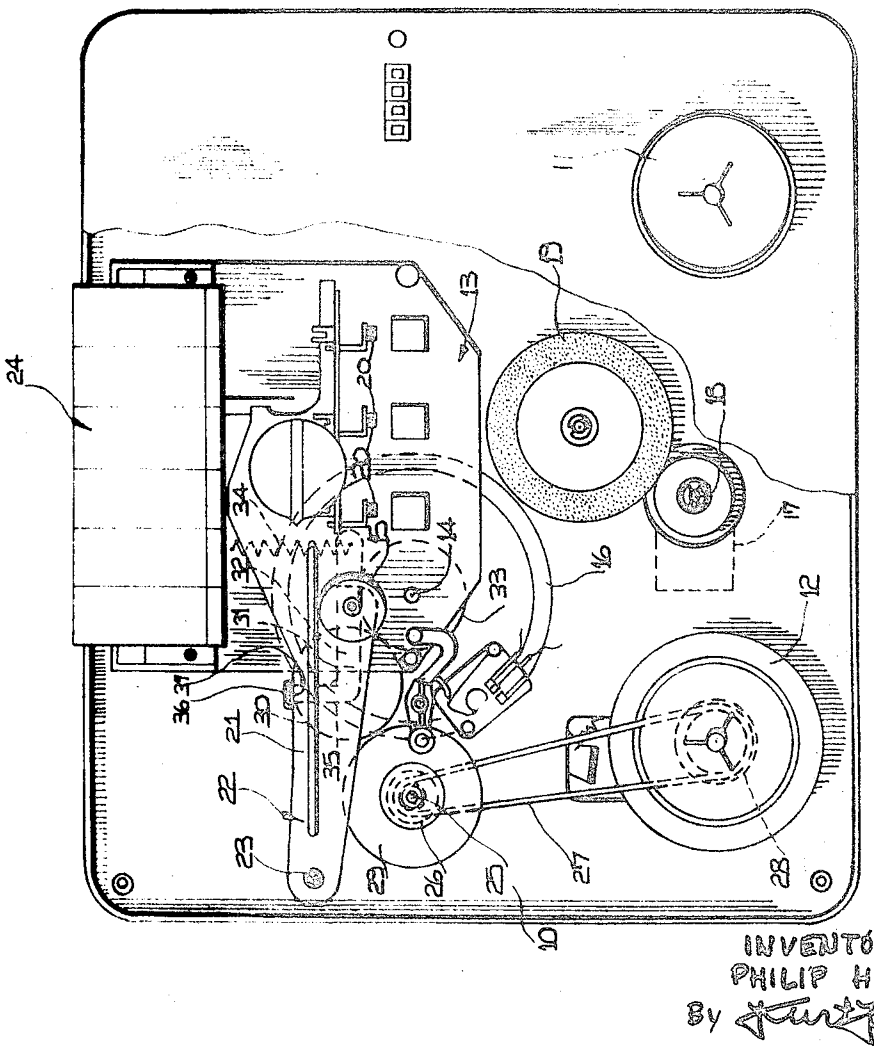
FIG. 1 is a plan view with part broken away, of a tape recorder according to the invention and, FIG. 2 is a side elevation, to an enlarged scale, and partly in section, of a friction wheel, pulley and slipping clutch, of the tape recorder of FIG. 1.

When the tape recorder is recording or playing back the arm 21 is pivoted from the at rest position shown in FIG. 1 in a direction to move the pressure pads 20 into engagement with the tape to press the tape against the transducer heads 13 and also to move the pressure roller 15 so as to press the tape against the rotating capstan spindle 14 thereby drawing the tape from the reel on the supply spool when the capstan spindle rotates.

The tape recorder has normal manual controls, indicated generally at 24, one of which, when operated, operates through appropriate linkage, not shown, to cause said movement of the arm 21 to engage the pressure roller 15 with the tape as above described.

In addition, the tape recorder is provided with a means for rotating the takeup spool 12 and the supply spool 11 in opposite directions so as to provide a fast wind or rewind of the tape through the apparatus. When such a fast winding operation is performed the arm 21 is pivoted so that the pressure roller 15 and pressure pads 13 are moved out of engagement with the tape.

During recording or playback, as the tape is drawn from the supply spool 11 past the transducer heads 13 by the capstan spindle 14 it is delivered from the capstan spindle and it is necessary to provide means for rotating the takeup spool 12 so as to take up the tape.

Because, during normal recording or playback, the linear speed of the tape transport is constant, the angular velocity of the takeup spool 12 must decrease progressively as the tape is wound upon the reel mounted upon the takeup spool because the radius of the wound tape upon the reel is continuously increasing.

The drive to the takeup spool is provided in the following way.

Adjacent to the takeup spool 12 and spaced away therefrom is provided a vertical spindle 25 on the tape deck. A pulley 26 is mounted on the spindle 25 so as to be freely rotatable thereon and an endless belt 27 is engaged with the pulley and with a further pulley 28 fixed relative to the takeup spool 12 so that the takeup spool 12 is rotated when the pulley 28 is rotated.

Also freely rotatably mounted on the spindle 25 is a first friction wheel 29 with a friction drive between the wheel 29 and the pulley 26, as to be described in more detail hereinafter. The first friction wheel is made in nylon or like material.

A second friction wheel 30 having a rubber tire is mounted on a platelike carrier member 31 pivotally mounted on the deck plate 10 for movement about a vertical axis 32. The second friction wheel 30 is positioned so as to be movable into and out of engagement with the first friction wheel 29 and a boss 33 provided on the capstan spindle 14.

A coil tension spring 34 is connected between a fixed part of the baseplate 10 and the carrier member 31 for the second friction wheel 30 to resiliently bias the second friction wheel 30 into engagement with the boss 33 and friction wheel 29.

The carrier member 31 has an arm 35 with an upstanding abutment 36 which engages with an edge part 37 of the arm 21. This edge part 37 faces away from the transducer heads 13 and capstan spindle 14 so that when the arm 21 is pivoted in the direction away from the capstan spindle 14 the engagement between said edge part 37 and said abutment 36 on the carrier 31 moves the second friction wheel 30 out of driving engagement with the boss 33 on the capstan and the first friction wheel 29. When the arm 21 is pivoted into its operative position, in which the pressure roller 15 is urged against the capstan spindle 14, the carrier 31 is permitted to move to bring the second friction wheel 30 into driving engagement with the first friction wheel 29 and the boss 33 under the influence of the coil tension spring 34.

The friction drive between the pulley 26 and the first section disc 29 is as follows, referring particularly to FIG. 2.

The pulley 26 is provided with a radial flange 38 providing an annular surface 39 which faces towards the first friction wheel 29 and which is provided with a felt annulus 40 secured thereto.

The first friction wheel 29 has a shallow cylindrical recess 41 formed in the base thereof which faces towards the pulley 26 and in the center of the recess 41 is provided a further, deeper, recess 42 having a tubular boss 43 therewithin. A coil compression spring 44 is engaged within the tubular space between the boss 43 and the wall of the further deeper recess 42 and an annular metal disc 45 is provided in the shallow recess. The disc is provided with two diametrically opposed ears 46 which engage in correspondingly shaped recesses 47 provided in the wall of the recess 41 to prevent relative rotation between the annular disc 45 and the first friction wheel 29.

Thus, when the friction wheel 29 and pulley 26 are assembled on the spindle 25, with movement of the friction wheel 29 away from the pulley being prevented by a circlip 48 provided on the spindle, the metal disc 46 is urged against the felt annulus 40 by the coil compression spring 42, thus providing a friction drive between the first friction wheel 29 and the pulley 26 which will slip when the resistance to turning of the pulley 26 from the belt 27 exceeds a predetermined value. This value may be adjusted by adjusting the strength of the coil compression spring or by providing a different friction material on the pulley.

In use, when the appropriate manual control is operated to cause playback or recording the capstan 14 is rotated by the electric motor 17 as described hereinbefore and the arm 21 carrying the pressure roller 15 and pressure pads 20 is pivoted to urge the tape against the transducer heads 13 and the capstan spindle 14.

As the arm 21 so pivots the abutment 36 on the carrier 31 follows the edge part 37 of the arm 21 and so allows the second friction wheel 30 to move into driving engagement with the first friction wheel 29 and with the boss 33 on the capstan 16 under the influence of the coil compression spring 34. Thus, the first friction wheel 29 is rotated and hence the pulley is also rotated through the slipping clutch and the takeup spool 12 is rotated through the endless belt 27.

Any irregularities in the periphery of the takeup spool 12 or any other irregularities which might lead to uneven rotary movement tend to be smoothed out by the resilience of the endless belt drive which also absorbs any tendency towards "-snatch" in the slipping clutch.

As the radius of the wound tape on the takeup spool increases, the constant rate at which the tape is transported by the capstan spindle acts as a brake on the takeup spool and this braking effect is taken up by the slipping clutch described hereinbefore, which permits a required degree of relative motion between the pulley 26 and friction wheel 29.

In addition, to the above-described advantages a further advantage of the takeup drive of the present invention is that variations in the size of the reel and tape for which the tape recorder is intended which involves different sizes of tape deck and different spacing between the centers of the takeup and supply spools may be accommodated without substantially altering the components parts of the drive. Since the variation in spacing of the spools may be accommodated by either stretching the belt of the endless drive by the necessary amount or by providing a different length of belt if the change in position is so great as to require this.

In addition, the rate of rotation of the takeup spool may be easily adjusted by providing, instead of the single pulley beneath the first friction wheel described hereinbefore, two or more pulleys of different diameter so that the speed of rotation of the takeup spool may be adjusted by engaging the endless belt with any desired one of the pulleys. This is particularly advantageous in mass production of the tape recorder because sometimes a two-pole motor is fitted at 17 and sometimes a four-pole motor and provision of the pulleys of different diameter enables the tape recorder to be easily adapted for either motor.

What I claim then is:

1. In a tape recorder comprising, an assembly of magnetic transducer heads, a supply spool, a takeup spool, a takeup drive to drive the takeup spool, a capstan spindle and a pressure roller to urge a magnetic tape against the capstan spindle, whereby in use a tape is drawn from the supply spool, transported past the transducer head and taken up on the takeup spool, the improvement wherein the takeup drive for the takeup spool comprises, a pulley, an endless belt engaged with the pulley to drive the takeup spool from the pulley, a friction wheel, a slipping clutch to transmit drive from the friction wheel to the pulley and means for driving the friction wheel from the capstan spindle.

2. The combination according to claim 1, wherein the friction wheel and the pulley are rotatably mounted on a common spindle, the slipping clutch being provided between the friction wheel and the pulley.

3. The combination according to claim 2, wherein the friction clutch comprises a first clutch element fixedly mounted on one of said members and a second clutch element nonrotatably mounted on the other of said members and resiliently biased towards the first clutch element so as to provide a frictional drive to said first clutch element.

4. The combination according to claim 3 wherein the first clutch element is provided on the pulley.

5. The combination according to claim 1, wherein the means for driving the friction wheel from the capstan spindle comprises a second friction wheel interposed between the capstan spindle and the first friction wheel.

6. The combination according to claim 5, wherein the second friction wheel is movably mounted on the deck plate for movement into, and out of, driving engagement with the capstan spindle and the first friction wheel.

7. The combination according to claim 6, wherein the movement into, and out of, driving engagement is under the control of a manually operable control of the tape recorder.

8. The combination according to claim 7, wherein the tape recorder has a pivoted arm carrying a pressure roller for urging the tape against the capstan spindle and the second friction wheel is carried on a carrier member having a portion which engages said arm to cause driving engagement of the wheel when the arm is moved into its operative position to press the tape against the capstan spindle, and to disengage the second friction wheel when the arm is moved to its inoperative position wherein the pressure roller is spaced from the capstan spindle.

9. The combination according to claim 8, wherein the carrier member is spring urged in the direction to cause engagement of the second friction wheel with the first friction wheel and the capstan spindle and may have an abutment which engages said arm so that said arm maintains said second friction wheel out of engagement with the first friction wheel and the capstan spindle when the arm is not in its operative position.

10. The combination according to claim 1, wherein the pulley is provided with two belt-engageable portions of different diameter.